US 12,244,760 B1

(12) United States Patent
Cox et al.

(10) Patent No.: US 12,244,760 B1
(45) Date of Patent: *Mar. 4, 2025

(54) USING CALLING PARTY NUMBER FOR CALLER AUTHENTICATION

(71) Applicant: TrustID, Inc., Lake Oswego, OR (US)

(72) Inventors: Patrick Michael Cox, Newberg, OR (US); Shreyas Dattatraya Saitawdekar, Portland, OR (US); Richard J. Greene, Portland, OR (US); Daniel V. Stone, Portland, OR (US)

(73) Assignee: TrustID, Inc., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,490

(22) Filed: Nov. 21, 2022

Related U.S. Application Data

(63) Continuation of application No. 17/652,034, filed on Feb. 22, 2022, now Pat. No. 11,509,763, which is a
(Continued)

(51) Int. Cl.
*H04M 3/42* (2006.01)
*H04L 9/40* (2022.01)
(Continued)

(52) U.S. Cl.
CPC ........ *H04M 3/42042* (2013.01); *H04L 63/08* (2013.01); *H04L 63/123* (2013.01);
(Continued)

(58) Field of Classification Search
CPC ............ H04M 3/42042; H04M 3/382; H04M 3/42068; H04M 2203/6027; H04L 63/08; H04L 63/123; H04W 12/06
(Continued)

(56) References Cited

U.S. PATENT DOCUMENTS 5,007,000 A 4/1991 Baldi
5,345,595 A 9/1994 Johnson et al.
(Continued)

FOREIGN PATENT DOCUMENTS

GB 2320644 A 6/1998

OTHER PUBLICATIONS

*Next Caller Inc. v. TrustID, Inc.* Petition for *Inter Partes* Review of U.S. Pat. No. 9,001,985 in IPR2019-00039, filed Oct. 5, 2018; 70 pages.
(Continued)

*Primary Examiner* — Binh Kien Tieu
(74) *Attorney, Agent, or Firm* — Sterne, Kessler, Goldstein & Fox P.L.L.C.

(57) ABSTRACT

Embodiments include a system, method, and computer program product that authenticates a caller using calling party information. In an embodiment, an authentication device receives the call request and associated calling party information that includes a calling party number. The authentication device retrieves parameters associated with the calling party number, where a retrieved parameter is a number of accounts linked to the calling party number. The authentication device determines whether the number of accounts is between one and a threshold value, inclusive, and verifies that the call request originates from a location or a device associated with the calling party number. Based on the verifying and determining, the authentication device generates an authentication result that indicates whether the calling party number is authenticated. Then, the authentication device sends the authentication result to a call processing device that processes the call request from the caller according to the authentication result.

20 Claims, 6 Drawing Sheets

Related U.S. Application Data continuation of application No. 16/990,698, filed on Aug. 11, 2020, now Pat. No. 11,258,896, which is a continuation of application No. 16/263,543, filed on Jan. 31, 2019, now Pat. No. 10,750,009, which is a continuation of application No. 15/700,560, filed on Sep. 11, 2017, now Pat. No. 10,389,872, which is a continuation of application No. 15/367,749, filed on Dec. 2, 2016, now Pat. No. 9,762,728.

(51) Int. Cl.
    *H04M 3/38*     (2006.01)
    *H04W 12/06*     (2021.01)

(52) U.S. Cl.
    CPC ....... *H04M 3/382* (2013.01); *H04M 3/42068* (2013.01); *H04W 12/06* (2013.01); *H04M 2203/6027* (2013.01)

(58) Field of Classification Search
    USPC .................................................. 379/142.05
    See application file for complete search history.

(56) References Cited

U.S. PATENT DOCUMENTS

| | | |
|---|---|---|
| 5,511,109 A | 4/1996 | Hartley et al. |
| 5,699,416 A | 12/1997 | Atkins |
| 5,793,846 A | 8/1998 | Katz |
| 5,953,399 A | 9/1999 | Farris et al. |
| 5,963,625 A | 10/1999 | Kawecki et al. |
| 6,307,926 B1 | 10/2001 | Barton et al. |
| 6,661,879 B1 | 12/2003 | Schwartz et al. |
| 6,668,044 B1 | 12/2003 | Schwartz et al. |
| 6,947,532 B1 | 9/2005 | Marchand et al. |
| 6,975,708 B1 | 12/2005 | Scherer |
| 6,987,841 B1 | 1/2006 | Byers et al. |
| 6,996,217 B2 | 2/2006 | Goldman |
| 7,042,987 B2 | 5/2006 | Schwartz et al. |
| 7,647,638 B2 | 1/2010 | Furuyama |
| 7,653,188 B2 | 1/2010 | Kloberdans et al. |
| 7,822,703 B1 | 10/2010 | Rodriguez-Val et al. |
| 7,912,192 B2 | 3/2011 | Kealy et al. |
| 8,068,590 B1 | 11/2011 | Kelson et al. |
| 8,085,911 B2 | 12/2011 | Martin et al. |
| 8,249,350 B2 | 8/2012 | Voloshynovskyy et al. |
| 8,355,492 B1* | 1/2013 | Polozola ................. H04M 3/54 379/114.15 |
| 8,520,832 B1 | 8/2013 | Condreay et al. |
| 8,681,956 B2 | 3/2014 | Lynam et al. |
| 8,744,052 B2 | 6/2014 | Gruchala et al. |
| 8,774,380 B2 | 7/2014 | Chingon et al. |
| 9,183,518 B2* | 11/2015 | Yingling, Jr. ........ G06Q 30/016 |
| 9,197,746 B2 | 11/2015 | Kurapati et al. |
| 9,332,119 B1 | 5/2016 | Danis |
| 9,762,728 B1* | 9/2017 | Cox ................. H04M 3/42042 |
| 9,781,255 B1 | 10/2017 | Gailloux et al. |
| 10,210,518 B2 | 2/2019 | Alnajem |
| 10,389,872 B1* | 8/2019 | Cox ..................... H04M 3/382 |
| 10,587,596 B1 | 3/2020 | Sahar et al. |
| 10,659,602 B1 | 5/2020 | Cox et al. |
| 10,750,009 B1* | 8/2020 | Cox ................. H04M 3/42068 |
| 11,258,896 B1* | 2/2022 | Cox ..................... H04L 63/123 |
| 11,509,763 B1* | 11/2022 | Cox ..................... H04M 3/382 |
| 2003/0225686 A1 | 12/2003 | Mollett et al. |
| 2006/0233160 A1 | 10/2006 | Kawanishi et al. |
| 2007/0081648 A1 | 4/2007 | Abramson et al. |
| 2007/0094509 A1 | 4/2007 | Wei et al. |
| 2007/0201625 A1 | 8/2007 | Martin et al. |
| 2007/0271339 A1 | 11/2007 | Katz |
| 2008/0084975 A1* | 4/2008 | Schwartz ............. H04M 3/436 379/88.22 |
| 2009/0022155 A1 | 1/2009 | Rosenberg et al. |
| 2009/0187508 A1 | 7/2009 | Placide |
| 2009/0213742 A1 | 8/2009 | French et al. |
| 2010/0275011 A1 | 10/2010 | Horgan et al. |
| 2011/0026699 A1* | 2/2011 | Amir .................... H04M 15/06 704/E15.001 |
| 2011/0082768 A1 | 4/2011 | Eisen |
| 2011/0185406 A1 | 7/2011 | Hirson et al. |
| 2011/0211685 A1* | 9/2011 | Liu ..................... H04L 65/1079 379/201.02 |
| 2012/0099714 A1 | 4/2012 | Hodge |
| 2012/0287823 A1 | 11/2012 | Lin |
| 2012/0295580 A1 | 11/2012 | Corner |
| 2015/0026786 A1 | 1/2015 | Alexander |
| 2015/0040220 A1 | 2/2015 | Mantripragada et al. |
| 2015/0215304 A1 | 7/2015 | Cao |
| 2015/0281925 A1 | 10/2015 | Doherty |
| 2016/0057107 A1* | 2/2016 | Call ....................... H04L 63/02 726/11 |
| 2016/0112569 A1 | 4/2016 | Timem et al. |
| 2016/0226872 A1 | 8/2016 | Oberheide et al. |
| 2017/0024733 A1 | 1/2017 | Purves |
| 2017/0070510 A1 | 3/2017 | Ramalingam et al. |
| 2017/0111364 A1* | 4/2017 | Rawat .................. G06F 21/316 |
| 2017/0134367 A1 | 5/2017 | Roth et al. |
| 2017/0178142 A1 | 6/2017 | Dutt et al. |
| 2017/0289207 A1 | 10/2017 | Evans |
| 2018/0020072 A1 | 1/2018 | Masuda et al. |
| 2018/0032526 A1 | 2/2018 | Cudak et al. |
| 2018/0324297 A1 | 11/2018 | Kent et al. |
| 2019/0335032 A1 | 10/2019 | Li |
| 2020/0396331 A1 | 12/2020 | Gupta et al. |
| 2021/0258421 A1 | 8/2021 | Jakobsson |

OTHER PUBLICATIONS

*Next Caller Inc.* v. *TrustID, Inc.* Decision to Institute U.S. Pat. No. 9,001,985 in IPR2019-00039, entered on Feb. 25, 2019; 41 pages.

*Next Caller Inc.* v. *TrustID, Inc.* Petition for *Inter Partes* Review of U.S. Pat. No. 8,238,532 in IPR2019-00961, filed Apr. 11, 2019; 76 pages.

*Next Caller Inc.* v. *TrustID, Inc.* Petition for *Inter Partes* Review of U.S. Pat. No. 8,238,532 in IPR2019-00962, filed Apr. 11, 2019; 77 pages.

*TrustID, Inc.* v. *Next Caller Inc.* Defendant's Initial Invalidity Contentions, Civil Action No. 18-cv-172-LPS-CJB, entered on Feb. 4, 2019; 12 pages.

*TrustID, Inc.* v. *Next Caller Inc.* Defendant's Initial Invalidity Contentions, Exhibit C1, Civil Action No. 18-cv-172-LPS-CJB, entered on Feb. 4, 2019; 234 pages.

*TrustID, Inc.* v. *Next Caller Inc.* Defendant's Initial Invalidity Contentions, Exhibit A1, Civil Action No. 18-cv-172-LPS-CJB, entered on Feb. 4, 2019; 182 pages.

*TrustID, Inc.* v. *Next Caller Inc.* Defendant's Initial Invalidity Contentions, Exhibit B1, Civil Action No. 18-cv-172-LPS-CJB, entered on Feb. 4, 2019; 226 pages.

*Next Caller Inc.* v. *TrustID, Inc.* Petition for *Inter Partes* Review of U.S. Pat. No. 9,871,913 in IPR2019-00963, filed Apr. 11, 2019; 73 pages.

*Next Caller Inc.* v. *TrustID, Inc.*, Patent Owner's Request for Rehearing, U.S. Pat. No. 9,001,985 in IPR2019-00039, entered on Mar. 11, 2019; 13 pages.

*Next Caller Inc.* v. *TrustID, Inc.*, Decision Denying Patent Owner's Request for Rehearing, U.S. Pat. No. 9,001,985 in IPR2019-00039, entered on Apr. 4, 2019; 8 pages.

*Next Caller Inc.* v. *TrustID, Inc.*, Patent Owner's Response, U.S. Pat. No. 9,001,985 in IPR2019-00039, entered on May 28, 2019; 79 pages.

*Next Caller Inc.* v. *TrustID, Inc.*, Petitioner's Reply, U.S. Pat. No. 9,001,985 in IPR2019-00039, entered on Sep. 4, 2019; 35 pages.

*Next Caller Inc.* v. *TrustID, Inc.*, Patent Owner's Sur Reply to Petitioner's Reply, U.S. Pat. No. 9,001,985 in IPR2019-00039, entered on Oct. 9, 2019; 41 pages.

(56) References Cited

OTHER PUBLICATIONS

*Next Caller Inc.* v. *TrustID, Inc.*, Final Written Decision, U.S. Pat. No. 9,001,985 in IPR2019-00039, entered on Feb. 24, 2020; 92 pages.
*Next Caller Inc.* v. *TrustID, Inc.*, Petitioner's Request for Rehearing, U.S. Pat. No. 9,001,985 in IPR2019-00039, entered on Mar. 18, 2020; 9 pages.
*Next Caller Inc.* v. *TrustID, Inc.*, Patent Owner's Request for Rehearing, U.S. Pat. No. 9,001,985 in IPR2019-00039, entered on Mar. 25, 2020; 19 pages.
*Next Caller Inc.* v. *TrustID, Inc.*, Patent Owner's Notice of Appeal, U.S. Pat. No. 9,001,985 in IPR2019-00039, entered on Jun. 26, 2020; 6 pages.
*Next Caller Inc.* v. *TrustID, Inc.*, Petitioner's Notice of Cross Appeal, U.S. Pat. No. 9,001,985 in IPR2019-00039, entered on Jul. 8, 2020; 4 pages.
*Next Caller Inc.* v. *TrustID, Inc.*, Order Denying Patent Owner's Request for Rehearing, U.S. Pat. No. 9,001,985 in IPR2019-00039, entered on Aug. 13, 2020; 13 pages.
*Next Caller Inc.* v. *TrustID, Inc.*, Order Denying Petitioner's Request for Rehearing, U.S. Pat. No. 9,001,985 in IPR2019-00039, entered on Aug. 13, 2020; 8 pages.
*Next Caller Inc.* v. *TrustID, Inc.*, Exhibit 1008—Declaration of James T Geier, U.S. Pat. No. 9,001,985 in IPR2019-00039, entered on Sep. 4, 2019; 48 pages.
*Next Caller Inc.* v. *TrustID, Inc.*, Exhibit 1012—Concise Oxford English Dictionary Excerpt, U.S. Pat. No. 9,001,985 in IPR2019-00039, entered on Sep. 4, 2019; 3 pages.
*Next Caller Inc.* v. *TrustID, Inc.*, Exhibit 1013—Merriam-Webster Collegiate Dictionary Excerpt, U.S. Pat. No. 9,001,985 in IPR2019-00039, entered on Sep. 4, 2019; 4 pages.
*TrustID, Inc.* v. *Next Caller Inc.*, Docket Report, Case No. 1-18-cv-00172 (DDE), generated on Oct. 7, 2021; 29 pages.
*TrustID, Inc.* v. *Next Caller Inc.*, Cross-Appelant Next Caller, Inc.'s Corrected Principal and Response Brief in appeal of IPR2019-00039, Appeal Nos. 20-1950, 20-2028 (consolidated), entered Dec. 9, 2020; 58 pages.
*TrustID, Inc.* v. *Next Caller Inc.*, Appeal Nos. 20-1950, 20-2028 (consolidated), slip opinion (Fed. Cir. Sep. 27, 2021), 18 pages.

\* cited by examiner

USING CALLING PARTY NUMBER FOR CALLER AUTHENTICATION

CROSS-REFERENCE TO RELATED APPLICATIONS

This application is a continuation of U.S. patent application Ser. No. 17/652,034, filed on Feb. 22, 2022, which is a continuation of U.S. patent application Ser. No. 16/990,698 (issued as U.S. Pat. No. 11,258,896), filed on Aug. 11, 2020, which is a continuation of U.S. patent application Ser. No. 16/263,543 (issued as U.S. Pat. No. 10,750,009), filed on Jan. 31, 2019, which is a continuation of U.S. patent application Ser. No. 15/700,560 (issued as U.S. Pat. No. 10,389,872), filed Sep. 11, 2017, which is a continuation of U.S. patent application Ser. No. 15/367,749 (issued as U.S. Pat. No. 9,762,728), filed Dec. 2, 2016, all of which are hereby incorporated by reference in their entirety.

BACKGROUND

Copyright Notice

© 2016 TRUSTID, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

Field of the Invention

The embodiments relate generally to calls placed in telecommunication and information service networks.

Related Art

Automatic Number Identification (ANI) is a service that provides to the recipient of the call the call's class of service and a 10-digit billing telephone number of a caller. Introduced in the 1960s, ANI informed business telephone customers with toll free circuits (800 or "Inward-WATS") who was calling, because the called business was paying tolls for the incoming call. Later, ANI and Calling Number Identification (Caller ID) were available to customers without toll free circuits to provide them with the 10-digit telephone number of the calling party. By the late 1980s, calling name services provided a caller's name, in addition to the caller's 10-digit number and class of service.

Businesses such as banks, call centers, and government entities, such as 911 service centers, have used ANI information to determine identity and to discover location. ANI information is also used for call routing assistance, workflow efficiency, authentication, and fraud mitigation. In one example, some businesses have inbound telephone answering systems (known as, for example, integrated voice response ("IVR") systems) that answer calls and are programmed with rules-based decision parameters based on the ANI information. Major financial institutions rely on ANI for bank-card activation, credit issuance, money transfers, new account applications, and customer service. These major financial institutions have relied on the layer of security that ANI provides.

Ways to control or manipulate ANI and caller ID information, however, are available. Historically, only telecommunications carriers and very large business users who subscribed to expensive multi-line Primary Rate Interface telephone circuits had the ability to manipulate ANI. For example, a large business may control ANI to display its main telephone number on all outgoing calls from its multiple lines, rather than each of the individual lines.

More recently, ANI and caller ID information has become easier to manipulate. Before the advent of information services network (e.g., Internet) telephony and deregulation, the telecommunications network was a closed system with one or both of a limited number of trusted FCC- and Public Utility Commission-licensed telecommunications companies adhering to a finite set of standards. Telecommunications decentralization and deregulation, as well as Internet telephony (e.g., Voice over Internet Protocol (VOIP) technology), have exposed this legacy architecture to new telephony products and services that inject calls and calling data from outside the legacy telecommunications network. The telephony network then delivers these calls and associated information, in most cases, without checking the ANI information's validity.

Because ANI and caller ID information can be more easily manipulated, individuals can more easily place calls with fabricated or "spoofed" ANIs for nefarious purposes. ANI fabrication or spoofing is a low cost, powerful penetration tool used to impersonate identity and location. VoiceXML applications let users change ANI and Caller ID information. Open source PBX software applications, such as Asterisk and FreeSwitch, allow users to manipulate ANI information. As an example, if the ANI field is left blank by the Asterisk or carrier switch, any user can easily manipulate the Caller ID information using Asterisk, thereby populating the ANI field with the same misinformation as the spoofed Caller ID. Asterisk allows users to send spoofed ANI in much the same way that businesses had been setting their ANI with PRI lines. Competitive service providers and telecommunication carriers can set their own ANI information. Multiple companies exist for the sole purpose of enabling anyone, anywhere, to spoof ANI and Caller ID for pennies each call.

Relying on inaccurate ANI information can undermine marketing, technical, and security processes used for authentication, identity, location, customer service, and activation. Decisions made using the current non-validated ANI place an enterprise at risk of diminished revenue by limiting new product offerings, increasing operational costs, and increasing losses from fraud.

Of the more than ten billion telephone calls placed annually to U.S. financial institutions alone, nearly all rely on ANI for security, location information, call routing, and identity authentication. For example, bank card activation fraud occurs by telephone as frequently as other remote banking channels (i.e., not face-to-face), such as ATM, email, and the World Wide Web. Knowing the caller's location or that the caller is in possession of an actual telephonic device is the foundation and an important factor for trusted telephone commerce.

On Dec. 22, 2010, President Obama signed into law the Truth in Caller ID Act of 2009, which makes it unlawful for a person to transmit misleading or inaccurate caller ID information with an intent to defraud; the Act amends the Communications Act of 1934. Several of the States have passed bills making misleading Caller ID spoofing illegal.

The Truth in Caller ID Act of 2009, however, does not itself guarantee that ANI can be trusted as is. Consequently, banks and other businesses often require additional factors of authentication to confirm the identity of a calling party. For example, IVRs or agents at call centers may require a calling party to input personally identifiable information (PII) to confirm the caller's identity. PII may include, for example, a social security number or a date of birth. Requesting additional PII information may prolong calls and further increase the processing time and resources of IVRs or agents.

Moreover, using PII to conduct information-based authentication has many challenges and risks. For example, information-based authentication using PII such as social security numbers or a mother's maiden names exposes the bank to additional risk. PII information is regulated, and, if the PII information in the bank's possession is lost or stolen from the bank, large costs and fines can be levied against the bank by government entities enforcing current data breach laws.

Additionally, because of the high number of past data breaches, a very high percentage of consumers have had their PII data compromised already, making PII available to criminals for use in ID theft. (In 2016, the Identity Theft Resource Center reported 6,333 breaches and 864 million records exposed since 2005.) In addition, social networking websites such as Facebook, LinkedIn, Ancestry, Twitter, and dozens more make PII readily available for the public, further de-valuing the use of PII knowledge as a tool for identity authentication. ANI is one of the authentication tools available to banks and other businesses that are not PII-based for telephone-based transactions.

BRIEF SUMMARY OF THE INVENTION

What is needed are system, method, or computer program product embodiments, or combinations and sub-combinations thereof, for using calling party information to authenticate the calling party so that the calling party's call request can be processed more efficiently. In an embodiment, an authentication device receives the call request and associated calling party information, the calling party information including a calling party number. The authentication device retrieves parameters associated with the calling party number, where a retrieved parameter may include a number of accounts linked to the calling party number, a number of occurrences and associated dates of fraud on those linked accounts, a device or location type, a status of the network signaling, or a trustworthiness of the calling party number. In an embodiment, the authentication device determines whether the number of accounts is between one and a threshold value, inclusive. The authentication device also verifies that the call request originates from a valid and trustworthy location or from a device associated with the calling party number and linked to a valid account or a threshold number of accounts. Further, based on the verifying and whether the number of accounts is determined to be between one and a threshold value, the authentication device generates an authentication result indicating whether the calling party number is authenticated. An authenticated calling party number, associated with the call request, can then be used as an ownership token of authentication to authenticate the caller. In an embodiment, the authentication device further determines whether the one or more linked accounts is free of fraudulent activity between one day and a threshold value of days to generate the authentication result. Upon generating the authentication result, the authentication device sends the authentication result to a call processing device that processes the call request according to the authentication result.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings are incorporated herein and constitute a part of this specification. In the drawings.

In the drawings, like reference numbers generally indicate identical or similar elements. Additionally, generally, the left-most digit(s) of a reference number identifies the drawing in which the reference number first appears.

DETAILED DESCRIPTION

Currently, authenticating a caller that originated a call request entails requesting the caller to submit, either vocally or via keypad, caller personal identifying information. But, caller identifying information is not a reliable indicator for authenticating the caller and the call request because caller identifying information may be easily obtained by unauthorized callers. In contrast, embodiments are described herein that use calling party information to authenticate the calling party information to authorize the calling party's call request without prolonging the call and achieving a high rate of fraud detection. In an embodiment, an authentication device analyzes a calling party number, included in the calling party information, associated with a received call request. As part of this analysis, the authentication device retrieves parameters associated with the calling party number. These parameters may include the number of accounts linked to the calling party number. This analysis further includes verifying the call request based on the calling party number, and determining whether the number of accounts, associated with the calling party number, is between one and a threshold value, inclusive. In an embodiment, the analysis further includes determining occurrences and associated dates of fraud on linked accounts, a device or location type associated with the call request, a status, validity, and truthfulness of the network signaling, or a trustworthiness of the calling party information, e.g., an ANI or a Caller ID.

Based on the verifying and the determining, the authentication device generates an authentication result indicating whether the calling party number is authenticated and whether that number can be used to authorize the call request. This authentication result can be used by a call processing receiver to, for example, receive and process the call request as an authorized call without further authentication. This procedure both streamlines a caller's experience with the call processing receiver and reduces the processing load on the call processing receiver.

Figure 1:
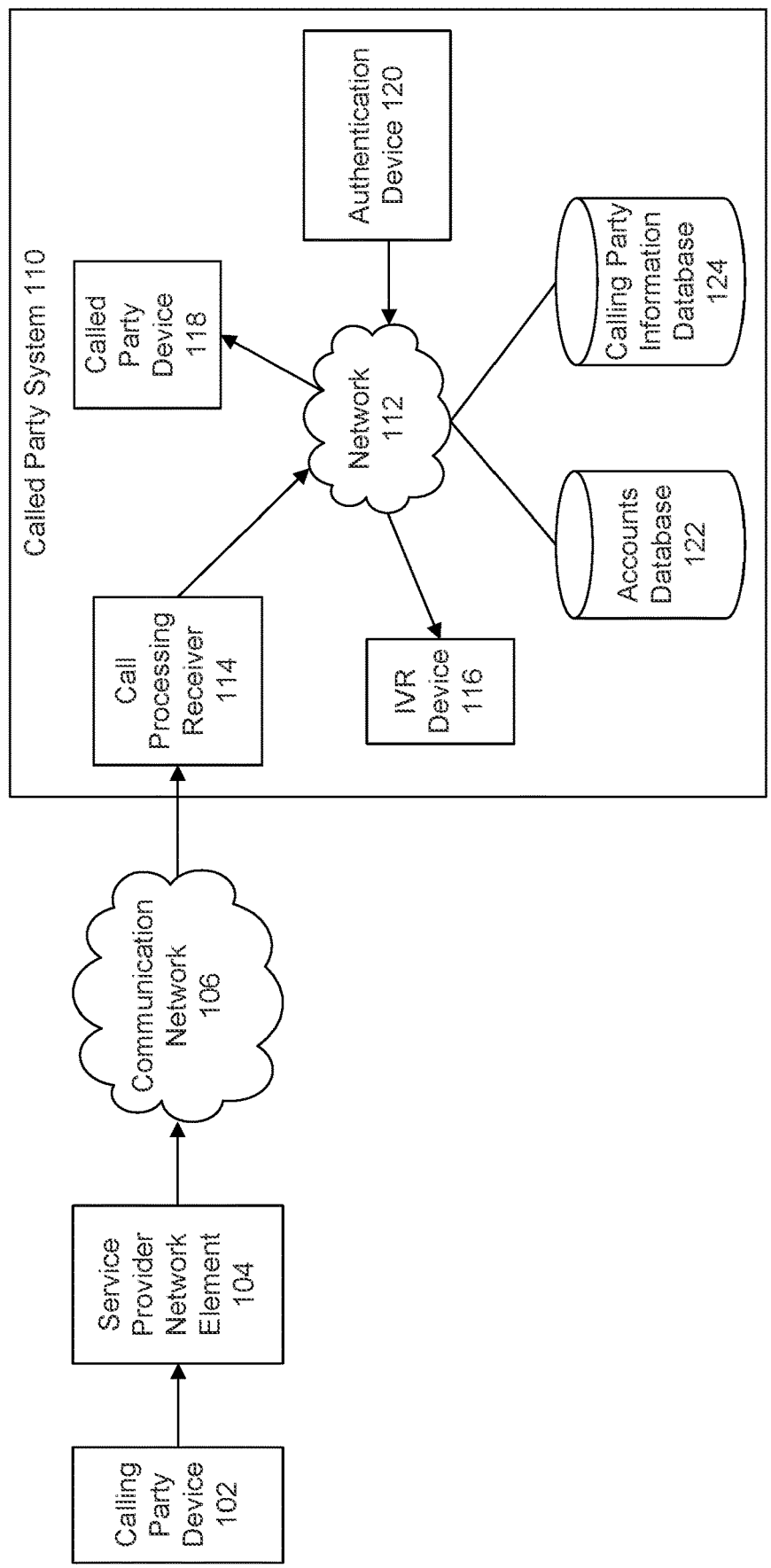
FIG. 1 is a block diagram of a system for call authentication based on calling party information, according to an embodiment.

FIG. 1 is a block diagram illustrating a system 100 for call authentication based on calling party information, according to an embodiment. System 100 includes calling party device 102, service provider network element 104, communication network 106, and called party system 110.

Calling party device 102 is any type of device used to place or receive a telephone call, including, for example, an analog telephone, a digital telephone, a wireless telephone, a computer telephony device, a Voice over Internet Protocol (VOIP) based telephone, or a private branch exchange (PBX) supporting multiple lines or key system supporting multiple lines. Calling party device 102 places a telephone call to called party system 100 via service provider network element 104.

Service provider network element 104 may include, but is not limited to, analog switches (e.g., 1AESS), digital switches (e.g., 5ESS), IP network switches, or IP network routers. Service provider network element 104 routes telephone calls over communications network 106 to called party system 110. Communications network 106 includes, for example, wire line or wireless networks, traditional plain old telephone service (POTS) networks, IP-based networks, or any combination or sub-combinations of these types of networks.

In an embodiment, when calling party device 102 places a telephone call to called party system 110, calling party device 102 transmits a call request containing calling party information, as well as called party information (e.g., a telephone number associated with called party system 110). Upon receipt of the call request, service provider network element 104 processes the call and provides further signaling to communications network 106 to complete and route the call to called party system 110. Depending on the type of call and technology of call made by calling party device 102, service provider network element 104 receives and processes the call request using various network protocols including, but not limited to, Session Initiation Protocol (SIP), Integrated Services Digital Network (ISDN), Plain Old Telephone Service (POTS), Time Division Multiplexing (TDM), or Voice over Internet Protocol (VOIP) call messaging protocols.

In an embodiment, calling party information includes a billing telephone number associated with or assigned to calling party device 102, information digits that specify a line type (e.g., a class of service), Caller ID (CID) information, or any combination of these. For example, calling party information may be Calling Line Information (CLI), Caller Line Identification (CLID), or Automatic Number Identification (ANI) information. ANI information includes the calling party's billing telephone number and ANI II digits representing the line type of calling party device 102. Typically, service provider network element 104 is operated by, for example, a telecommunications carrier. Service provider network element 104 sends the calling party information to called party system 110 along with or before the voice portion of the call is transferred to called party system 110.

Called party system 110 represents systems and devices implemented within a call center or service center of a business entity, such as a bank, that commonly needs to authenticate a calling party's identity. For example, called party system 110 may be a bank-card activation center or a 911 emergency services call center. As shown in FIG. 1, called party system 110 includes network 112, call processing receiver 114, interactive voice response (IVR) device 116, called party device 118, authentication device 120, accounts database 122, and calling party information database 124. Each of these components within called party system 110 is implemented by one or more servers.

Call processing receiver 114 is any type of device that processes a call request received from calling party device 102 via communications network 106. In an embodiment, call processing receiver 114 analyzes received calling party information to determine where to route the call request. For example, call processing receiver 114 may route the received call request to IVR device 116 or called party device 118 via network 112. Called party device 118 is a device similar to calling party device 102, but operated by an agent of called party system 110. Network 112 may represent any wired or wireless network, and may include any combination or sub-combination of local area networks (LANs), wide area networks (WANs), the Internet, POTS, or another wide area data communications network. In an embodiment, call processing receiver 114 is a part of an automatic call distribution (ACD) system or implemented within IVR device 116.

IVR device 116 interfaces a caller operating calling party device 102 with called party system 110, e.g., accounts database 122, without intervention from a human agent. In an embodiment, IVR device 116 interacts with the caller through voice commands instructing the caller to communicate a reason for the telephone call or to select from pre-programmed options via a telephone keypad (e.g., Dual Tone Multifrequency (DTMF) commands). In an embodiment, based on instructions or selections from calling party device 102, IVR device 116 additionally routes the call request to called party device 118 or retrieve information from accounts database 122.

When called party system 110 is a business entity, for example, a bank, IVR device 116 requests calling party device 102 to transmit a plurality of personally identifiable (PII) information or other account information before allowing the caller to access information from accounts database 122 or routing the call request to called party device 118. IVR device 116 receives the transmitted PII as keypad inputs or via voice transmissions. When receiving voice transmissions, IVR device 116 may include voice recognition functions to parse the received PII. As described in the background, PII information may be obtained by unauthorized callers due to security breaches. Thus, not only do traditional IVR device 116 expend significant time and processing power to verify the received PII or account information, but also the verification is unlikely to prevent unauthorized callers, e.g., criminals, from accessing accounts database 122.

In an embodiment, to reduce the time needed and processing performed by, for example, IVR device 116, called party system 110 implements authentication device 120. In an embodiment, some or all of the functionality provided by authentication device 120 is provided by a system external to called party system 110. For example, a device, operated by a third party, may communicate with called party system 110, via communication network 106, to provide the functionality. Authentication device 120 receives a request from call processing receiver 114 to authenticate and pre-authorize an incoming call, i.e., the call request from calling party device 102, before the call is answered and while the calling party hears one or more ringing tones. In an embodiment, authentication device 120 determines whether the received calling party number can be used as an authentication token, i.e., an ownership token of authentication, for authenticating the call from operating calling party device 102. But authentication device 120 is not limited to receiving only the calling party number from call processing receiver 114. In an embodiment, authentication device 120 receives other types of information such as a time of day of the call, trunk number, ANI II digits, dialed number information (DNIS) or called party number, session initiation protocol (SIP) header and routing information, transaction number, unique identifier, or information or data generated by call processing receiver 114 or communications network 106. In an embodiment, authentication device 120 uses one or more types of the aforementioned information, obtained via communication network 104, to determine a status, validity, and truthfulness of the network signaling. One or more of these types of information may be received from service provider network element 104 or from a separate device connected to communication network 106.

In an embodiment, as part of authenticating the calling party number, authentication device 120 queries accounts database 122 for account information associated with the calling party number. Within a bank context, for example, accounts database 122 includes bank account information such as bank transactions, balance information, transfer information, credit limits, and any logged fraud attempts etc. Authentication device 120 compares retrieved account information with a plurality of authentication parameters to determine whether the caller (and associated call request) should be authenticated, further described with respect to FIGS. 3-5. For example, authentication device 120 may check whether the calling party number associated with the call request is linked to an existing, valid account that has been tagged with a fraud attempt within the past threshold number of days.

In an embodiment, authentication device 120 queries calling party information database 124 for attributes associated with and logged for the calling party number. For example, attributes may include, without limitation, a call frequency, a line type of the calling party number, or a number of accounts linked to the particular account etc. Authentication device 120 similarly compares the queried attributes with the corresponding authentication parameters in determining whether the caller is or should be authenticated, also further described with respect to FIGS. 3-5.

By authenticating the calling party, authentication device 120 enables devices of called party system 110, e.g., IVR device 116, to process the received call as an authenticated call without further processing. In an embodiment, called party system 110, e.g., IVR device 116, uses the authentication result to pre-authorize requests associated with the call request without further processing. To do this, in an embodiment, authentication device 120 sends an authentication result including, for example, an authentication token, to call processing receiver 114 that routes the call request based on the result. This authentication token may include, for example, the billing telephone number, such as the ANI number, associated with the calling party. In an embodiment, by treating the billing telephone number as an authentication token, authentication device 120 can authorize future telephones calls associated with this billing telephone number without additional verification.

In an embodiment, if no authentication token was generated, e.g., authentication device 120 did not authenticate the call request based on the calling party information, call processing receiver 114 may route the call request to a device that requires additional input from calling party device 102 to authenticate the caller before authenticating the call.

In an embodiment, authentication device 120 authenticates the calling party of the call request while or after the call has been routed, by call processing receiver 141, to IVR device 116 or called party device 118. For example, the authentication process for a particular incoming call may exceed a threshold time. In this case, call processing receiver 114 routes the incoming call to IVR device 116 or called party device 118 before the calling party and associated calling party number has been authenticated by authentication device 120. In this scenario, authentication device 120 sends to the routed device, such as called party device 118, a message (e.g., visual or audio) indicating whether the call request and associated calling party is authenticated. For example, authentication device 120 may generate or find an authentication token to associate with the calling party number.

The routed device processes the call request based on the received authentication result. For example, if the result, which may include the authentication token, indicates that the call request cannot be authenticated, IVR device 116 may trigger a script that requires additional information to be provided by the caller. Similarly, called party device 118 receiving a negative result may indicate to an agent via, for example, visual or audio signals that the agent needs to proceed with caution.

Figure 2:
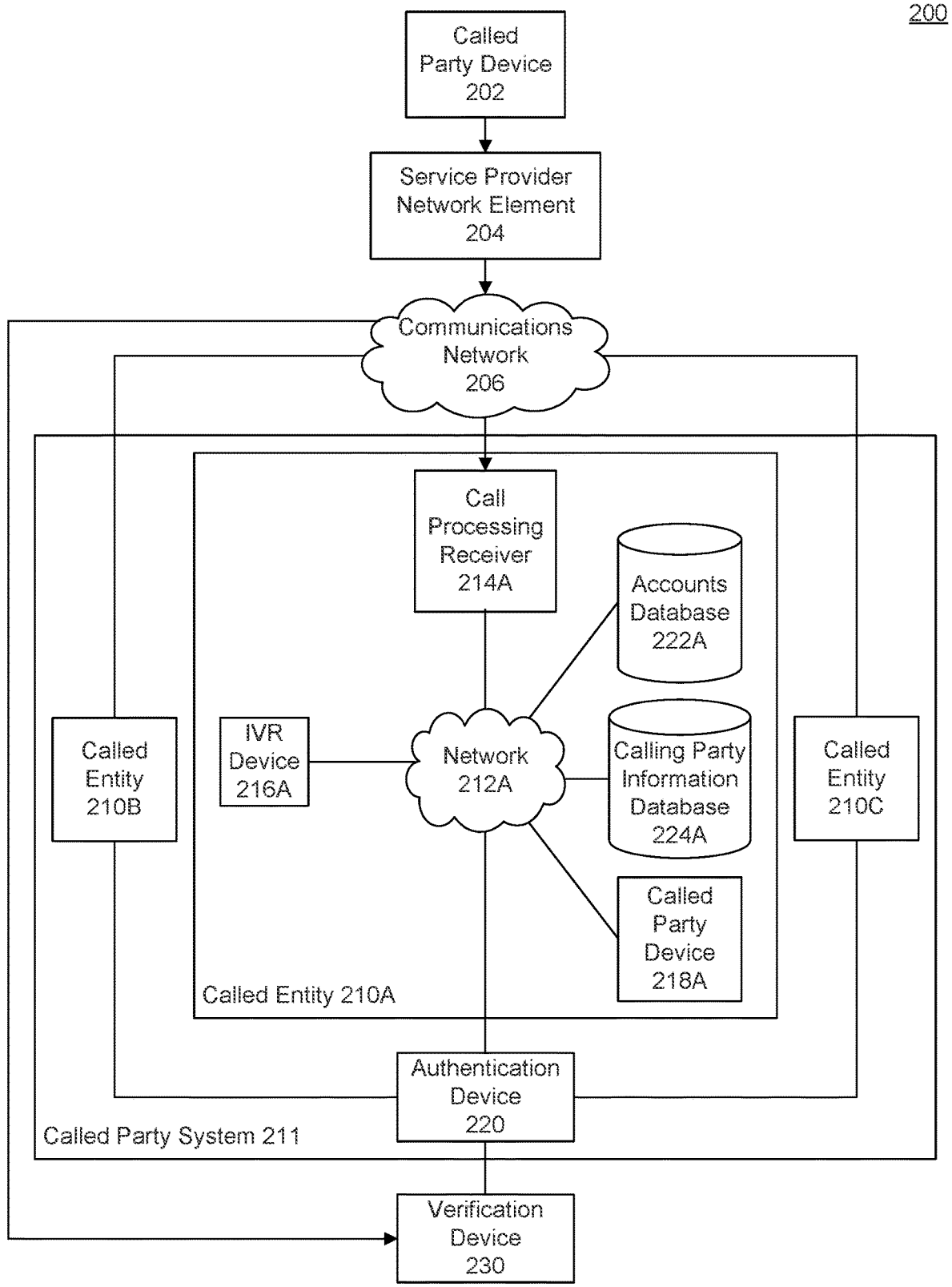
FIG. 2 is a block diagram of distributed system for call authentication based on calling party information, according to an embodiment.

FIG. 2 illustrates a distributed system 200 for call authentication based on calling party information, according to an embodiment. Distributed system 200 includes called party device 202, service provider network element 204, communications network 206, called party system 211, and verification device 230. In an embodiment, each of the components of distributed system 200 corresponds to the similarly named components of FIG. 1. For example, called party device 202 places a call to called party system 211 via service provider network element 204. Then, service provider network element 204 routes the call to called party system 211 via communications network 206.

In an embodiment, called party system 211 includes multiple called entity 210A-C, each associated with one or more called telephone numbers. For example, called party system 211 may represent a call center and each of called entity 210A-C may represent a department, branch, or group within the call center. In an embodiment, each of called entity 210A-C services a different set of called telephone numbers. Communications network 206 routes a call request to a call processing receiver, such as call processing receiver 214A, of called entity 210A based on, for example, the called telephone number within the call request.

Similar to the centralized called party system 110 of FIG. 1, called entity 210A may include similarly named components: call processing receiver 214A, IVR device 216A, called party device 218A, accounts database 222A, and calling party information database 224A. But in contrast to called party system 110, authentication device 220 may be centralized across called entity 210A-C.

Authentication device 220 processes received call requests and associated calling party numbers from any of called entity 210A-C via respective call processing receivers 214A-C. In an embodiment, authentication device 220 retrieves information from accounts database 222A-C and calling party information database 224A-C across each called entity 210A-C. In an embodiment, as part of authenticating a received calling party number and authenticating an associated call request, authentication device 220 further distributes processing to verification device 230.

Verification device 230 may be a component of authentication device 220 or, in an embodiment, part of a system external to called party system 211. In an embodiment, verification device 230 communicates with authentication device 220 over communications network 206 or another IP-based network, such as the Internet. In an embodiment, to confirm the credibility and validity of a calling party number, verification device 230 is coupled to one or more service provider network element 204 via, for example, communications network 206. By doing so, verification device 230 may receive various types of information to determine a truthfulness of the network signalling from communications network 206. For example, the information may include a time of day of the call, trunk number, ANI II digits, dialed number information (DNIS) or called party number, session initiation protocol (SIP) header and routing information, transaction number, unique identifier, or information or data generated by call processing receiver 214A-C.

In an embodiment, upon receiving a calling party number, verification device 230 determines the calling party number is valid based on calling party number attributes or an operating status of the calling party number. In an embodiment, to authenticate the caller and associated call request, verification device 230 must determine that the associated calling party number is valid. In an embodiment, verification device 230 verifies, in part, the calling party number after determining that the calling party number originates from a known physical location assigned to or associated with the calling party number. In an embodiment, verification device 230 verifies, in part, the calling party number after determining that the calling party number originates from a type of the calling device, e.g., a physical device such as a handset, known to be associated with or assigned to the calling party number. To do this, verification device 230 may place an outbound call to the calling party number and analyze an operating status of the outbound call. In an embodiment, verification device 230 determines that a calling party number should not be verified based on a type of the device, e.g., a prison phone, a payphone, a phone associated with a large company, etc.

In an embodiment, in addition to determining a validity or credibility of a calling party number, verification device 230 determines a credibility score, i.e., a trustworthiness level, indicating how likely that the calling party number is valid based on various calling party number parameters, the operating status, among other related information received from, for example, service provider network element 204. For example, verification device 230 may be implemented similar to the methods and systems described in U.S. Pat. No. 8,238,532B1, titled "Method and System for Discovering and Reporting Trustworthiness and Credibility of Calling Party Number Information," which is incorporated by reference herein in its entirety.

Figure 3:
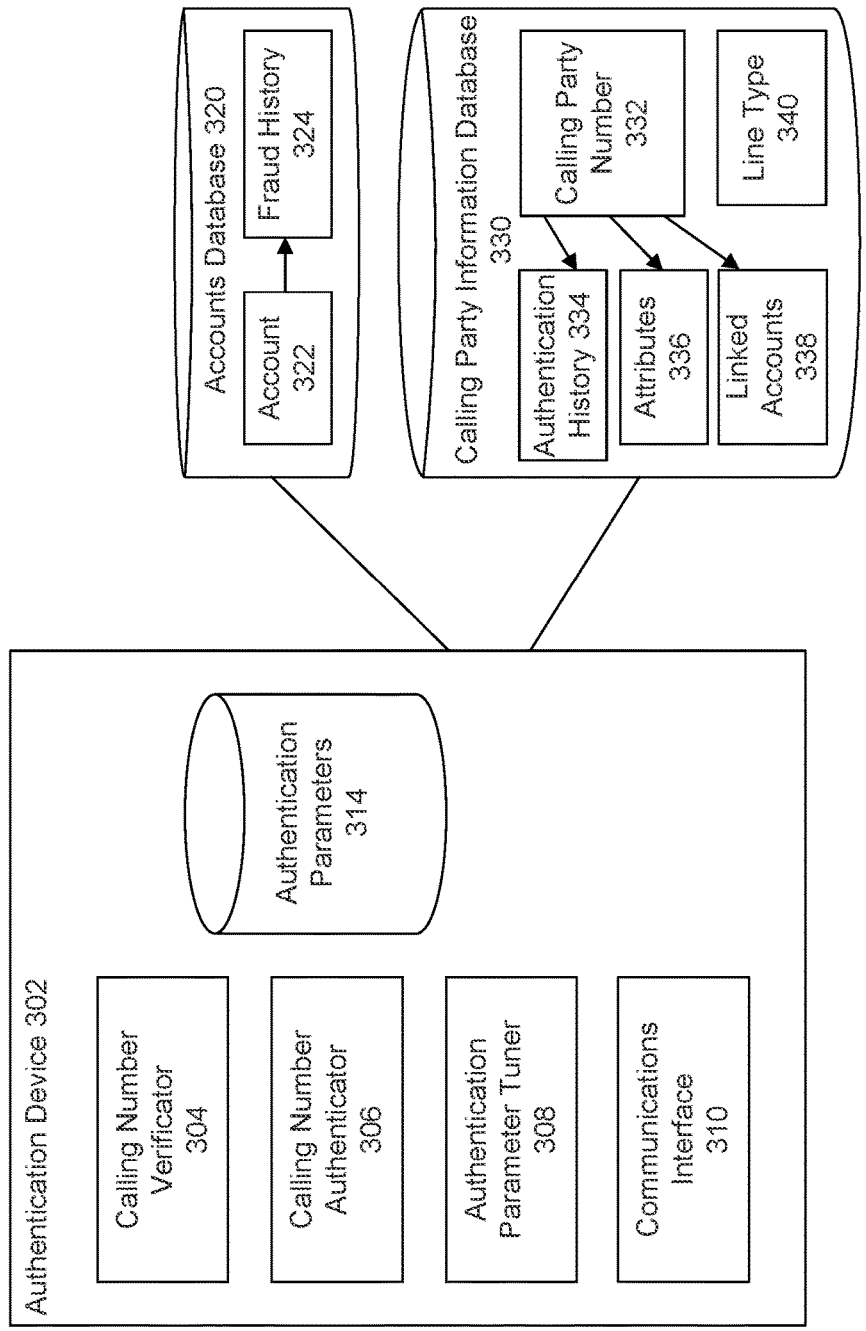
FIG. 3 is a block diagram of a system for authenticating a caller based on calling party information, according to an embodiment.

FIG. 3 is a block diagram illustrating a system 300 for authenticating calling party information for authenticating a call, according to an embodiment. System 300 includes authentication device 302 coupled to accounts database 320 and calling party information database 330. Authentication device 302 is an example implementation of authentication device 120 from FIG. 1 or an example of a centralized device serving a plurality of distributed called entities, as further described with respect to authentication device 220 of FIG. 2.

Accounts database 320 includes account 322 managed or provided by a called party system, such as called party system 110 of FIG. 1. Accounts database 320 also stores information related to account 322 including, without limitation, a unique account identifier (ID), PII of account holder (e.g., an account holder's legal name or date of birth), one or more calling party numbers linked with one or more account 322, account age, account standing, whether a credit limit has been exceeded, or transaction history. Accounts database 320 may also include fraud history 324 associated with account 322. In an embodiment, fraud history 324 includes one or more of: logged occurrences of fraud for account 322, associated dates of fraud, a type of fraud logged for or associated with account 322, a location of the fraud, a severity of the fraud, or a date or time when fraud was identified or logged, or a combination thereof. In some embodiments, fraud history 324 further includes statistical analysis of logged instances of fraud related to a number of the fraud occurrences or fraud types, The type of fraud may be a means by which fraud was performed or detected including, for example, by telephone call, by web portal, by ATM, or by physical transaction with an agent (e.g., with a bank teller). In an embodiment, one or more designated types of fraud, e.g., ATM fraud, associated with a linked account 322 do not negatively affect an authentication result generated by authentication device 302. Further, a fraud type may include a severity of the fraud where fraud with designated dollar amounts is classified as a type of fraud, e.g., low-severity fraud type versus high-severity fraud type. In an embodiment, accounts database 320 includes, in part, account information and fraud history retrieved across a plurality of databases, such as accounts database 222A-C within called party system 211 of FIG. 2.

Calling party information database 330 includes calling party number 332, such as a calling party number or billing number from ANI received in calling party information. In an embodiment, for each calling party number 332, calling party information database 330 stores associated authentication history 334, attributes 336, or linked accounts 338. In an embodiment, calling party information database 330 includes or represents, in part, calling party information from calling party device 218A-C across called entity 210A-C of FIG. 2. In an embodiment, calling party information database 330 includes information received from, for example, service provider network element 204 of FIG. 2.

In an embodiment, authentication history 334 includes whether the calling party number had been successfully authenticated in the past, and how long ago the authentication or authentication was performed. For example, a calling party number may be authenticated as a valid calling number from a known physical calling device, but the calling party number may not have been previously linked to or associated with any existing valid accounts. Therefore, for example, the calling number may be valid but not authenticated. In an embodiment, authentication history 334 stores information indicating that a calling party number was previously authenticated in which case the received calling party is used as an authentication token for authenticating, and possibly authorizing, the call request without requesting additional information from the calling party.

In an embodiment, attributes 336 includes calling attributes associated with calling party number 332. For example, attributes 336 may include, without limitation, a frequency of calls (e.g., a number of calls within a threshold timeframe that originates from calling party number 332), a velocity of calls (e.g., how frequently calls are allegedly originating from calling party number 332), or a line type (e.g., a landline, an IP phone, a cellular phone, etc.). In an embodiment, linked accounts 338 includes the number of accounts currently linked to calling party number 332 or the specific accounts themselves. Linked accounts 338 may also include information indicating a status of the accounts, e.g., an account has not been closed.

In an embodiment, calling party information database 330 includes a table of line type 340 that authentication device 302 may query to, for example, determine a line type of a specific calling party number 332. For example, authentication device 302 may query line type 340 based on the ANI II digits of an ANI within the call request. In an embodiment, line type 340 includes, without limitation, a landline POTS line, a multiparty line, unassigned, a toll-free line, a payphone line, a prison/inmate service line, a cellular/wireless line, an IP phone line, or other line types. In an embodiment, authentication device 302 determines whether a calling party number should be authorized based on the identified line type.

Authentication parameters 314 include one or more thresholds used by the components of authentication device 302 to determine whether a calling party number (and associated call request) can be authenticated. In an embodiment, the authentication result is used to determine whether the associated call request should be authorized. In an embodiment, authentication parameters 314 stores one or more thresholds for one or more parameters stored in accounts database 320 and calling party information database 330. For example, for a frequency of calls (an example parameter) stored in attributes 336, a stored threshold may be 10 calls within the past 24 hours. Authentication device 302, e.g., calling number authenticator 306, may determine that, for example, a call request should not be authenticated if the number of calls associated with the calling number exceeds the threshold of 10 calls within the past 24 hours. In an embodiment, authentication parameters 314 stores multiple thresholds for the same parameter conditioned on a classification of the calling party number. For example, authentication parameters 314 may store different thresholds for each line type such that some line types (known to be associated with lower fraud) have more lenient thresholds.

In an embodiment, to authenticate a received calling number, authentication device 302 implements the following components: calling number verificator 304, calling number authenticator 306, authentication parameter tuner 308, and communications interface 310. Each component may include a selection of stored operations that when executing in the one or more processors of authentication device 302 causes the one or more processors to perform the operations of that component.

Communications interface 310 is configured to enable network communications between authentication device 302 and one or more the devices and components of FIG. 1, such as call processing receiver 114, IVR device 116, or called party device 118, or FIG. 2, such as called entity 210A-C. For example, communications interface 310 may connect to network 112 of FIG. 1 or networks 212A-C of FIG. 2. In an embodiment, communications interface 310 connects to, for example, communications network 206 to retrieve information from, for example, service provider network element 204 of FIG. 2. In an embodiment, communications interface 310 transmits an authentication result to, for example, call processing receiver 114 of FIG. 1 before the call request is routed by call processing receiver 114. If the call has been routed, communications interface 310 transmits the authentication result to the routed device, such as IVR device 116 or called party device 118 of FIG. 1. In an embodiment, the routed device, such as call processing receiver 114 or IVR device 116, uses the authentication result to authorize the call request.

Calling number verificator 304 verifies the call request by verifying that the call request originates from the purported calling party number. In an embodiment, calling number verificator 304 receives the calling party number and associated information from, for example, call processing receiver 114 of FIG. 1. The calling party number and associated information may include ANI or Caller ID information.

To determine whether the calling party number is valid, calling number verificator 304 may perform ANI analysis while the caller's calling device, such as calling party device 102 of FIG. 1, is in an actual or virtual on-hook condition and an answered condition. In an embodiment, to perform ANI analysis, calling number verificator 304 queries calling party information database 330 for attributes 336 associated with calling party number 332 corresponding to the received calling party number. Additionally or alternatively, calling number verificator 304 may receive one or more attributes from service provider network element 104 of FIG. 1.

Then, calling number verificator 304 may compare one or more attributes 336 with corresponding thresholds or requirements of authentication parameters 314. For example, calling number verificator 304 may check that the calling party number's line type (an example attribute 336) is of a line type within authentication parameters 314 and that the frequency of calls (an example attribute 336) is below the threshold specified in authentication parameters 314. Calling number verificator 304 additionally checks a format of the calling number, e.g., that it includes 10 digits.

In an embodiment, when the calling party number is a line associated with or assigned a static physical location, calling number verificator 304 verifies calling party number as valid by verifying that the calling party number originates from that physical location. For example, calling number verificator 304 may compare an originating switch identifier with the NPA-NXX (area code/exchange) digits of the calling party number.

In an embodiment, calling number verificator 304 verifies the calling party number based on, in part, verifying that the calling party number originates from a physical calling device or a device type assigned to or associated with the calling party number. To do this, calling number verificator 304 may query a network condition or a call operational status while placing one or more outbound calls to the calling party number, e.g., the telephone number represented by an ANI of the call request. In an embodiment, calling number verificator 304 places the one or more outbound calls before the call request is processed or answered. Example network conditions may include busy, ring then answer, call forward then answer, or ringing no answer. Further descriptions of the ANI analysis including, for example, gathering other types of network conditions are provided in the '532 patent.

In an embodiment, calling number verificator 304 requests a separate device such as verification device 230 of FIG. 2 to perform the authentication. In this embodiment, calling number verificator 304 is an interface to, for example, verification device 230.

Calling number authenticator 306 determines whether an incoming call request received from, for example, call processing receiver 214A of FIG. 2, should be authenticated based, in part, on the verification result generated by calling number verificator 304 that verifies a received calling party number is valid. In an embodiment, calling number authenticator 306 queries calling party information database 330 for linked accounts 338 of calling party number 332 corresponding to the calling party number of the call request. Calling number authenticator 306 may also retrieve one or more of authentication history 334 or attributes 336 associated with calling party number 332. For each of linked accounts 338 that has been identified, calling number authenticator 306 also queries accounts database 320 for fraud history 324 and other information associated with each identified account 322. In an embodiment, to determine whether to authenticate the calling party associated with the call request, calling number authenticator 306 checks whether one or more portions of received information satisfy the thresholds or requirements of authentication parameters 314. In an embodiment, calling number authenticator 306 generates a message indicating that the calling party of the call request is authenticated or not authenticated.

Additionally or alternatively, calling number authenticator 306 may compute a risk score (or confidence score) based on whether specific portions of received information satisfy the thresholds or requirements of authentication parameters 314. For example, a risk score may range from 1 (highest risk) to 5 (lowest risk), though other ranking schemes would be apparent to one skilled in the art. In an embodiment, calling number authenticator 306 selects a maximum risk score, i.e., a risk threshold, for authenticating the call request based, in part, on a line type of the calling party number or a reason for the call. For example, a landline or mobile line type may be associated with a lower maximum risk score than compared to an IP phone or payphone. In an embodiment, calling number authenticator 306 determines the reason for the call based on, for example, the dialed number (DNIS) or additional information (e.g., keypad inputs or voice inputs) received from calling party device 102. For example, a request to check a balance of account 322 may be associated with a lower maximum risk score than compared to adding a member to account 322. In an embodiment, the calculated risk score is affected by the verification result generated by calling number verificator 304.

To generate an authentication result using the computed risk score, calling number authenticator 306 compares the computed risk score with the maximum risk score selected for the current received call request. When the computed risk score is less than or equal to the maximum risk score, calling number authenticator 306 authenticates the calling party number and associated call request. In an embodiment where the call request is authenticated before it is answered, calling number authenticator 306 sends an authentication result to a call processing receiver that originated the request, such as call processing receiver 214A of FIG. 2, to authorize the call request. In an embodiment, calling number authenticator 306 sends an authentication result after the call request has been routed by the call processing receiver and answered by an IVR device or a called party device. In this case, calling number authenticator 306 sends the message to the routed device that processes the call request based on the authentication result. For example, an IVR device that receives a negative authentication result, which indicates the call request should not be authorized, may run one or more scripts requesting the caller to submit PII to verify his or her identity. Further embodiments are described with respect to FIGS. 4-6.

Authentication parameter tuner 308 adjusts one or more thresholds or requirements of authentication parameters 314 to increase how accurate calling number authenticator 306 is in determining whether a given calling party number can authenticate a call request. Particularly, authentication parameter tuner 308 determines that calling number authenticator 306 fails to correctly authenticate a call request when fraud is subsequently logged or determined for an authenticated call request. In an embodiment, authentication parameter tuner 308 additionally fails to correctly authenticate a call request when calling number authenticator 306 fails to authenticate a call request that is subsequently determined to be fraud-free. In an embodiment, to reduce fraud, authentication parameter tuner 308 adjusts one or more thresholds or requirements of authentication parameters 314 to reduce incorrectly authenticated call requests, i.e., authenticated call requests that are subsequently associated with fraud.

Figure 4:
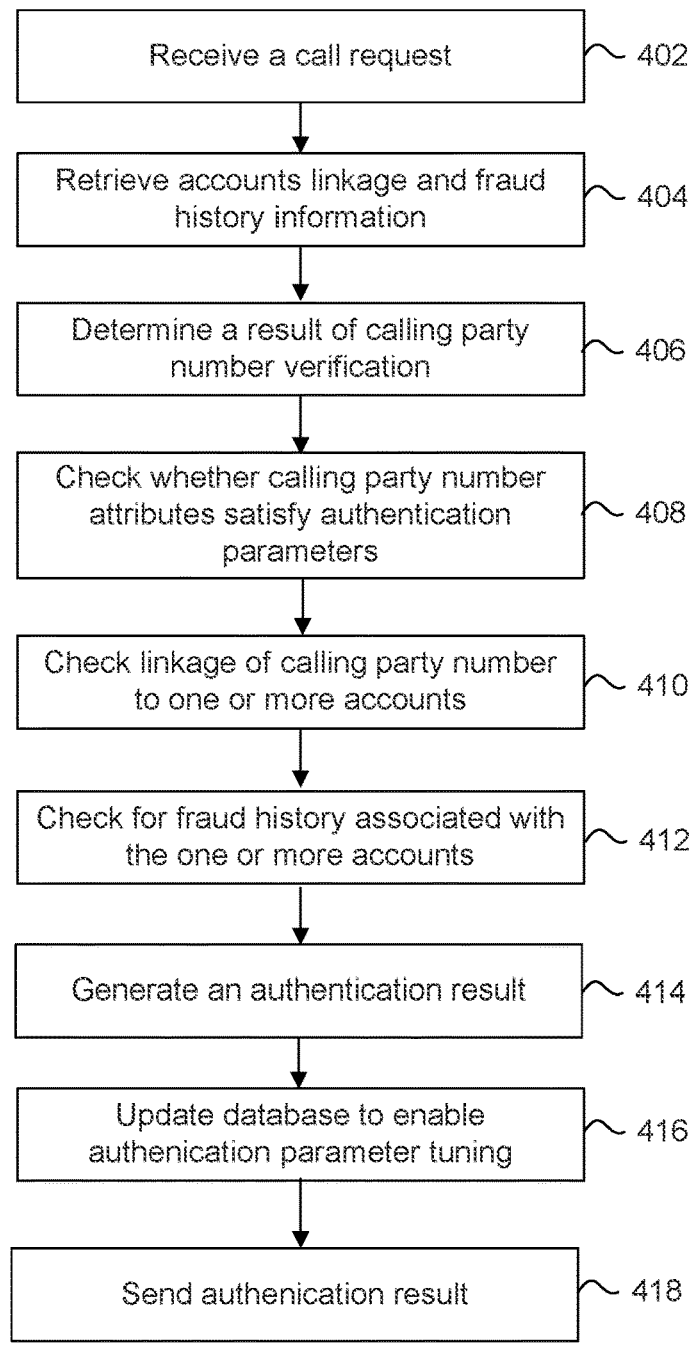
FIG. 4 is a flowchart of a method for generating an authentication result, according to an embodiment.

FIG. 4 is a flow chart of a method 400 for generating an authentication result, according to an embodiment. In an embodiment, method 400 is performed by authentication device 302 of FIG. 3. For ease of reference, method 400 will be described with respect to the components of authentication device 302.

Method 400 starts at step 402. In step 402, calling number verificator 304 receives a call request from a call processing receiver, such as call processing receiver 114 of FIG. 1. The call request includes at least a called party number and calling party information, which may include a calling party number. In an embodiment, the calling party information includes, but is not limited to, ANI information or caller ID information.

In step 404, calling number authenticator 306 queries calling party information database 330 to retrieve linked accounts 338, attributes 336, or authentication history 334 information for calling party number 332 corresponding to the received calling party number, e.g., within ANI. Additionally, calling number authenticator 306 queries accounts database 320 to retrieve fraud history 324 information for each account 332 identified in linked accounts 338.

In step 406, calling number verificator 304 determines a result of calling party number verification. In an embodiment, calling number verificator 304 determines whether the calling party number can be verified as a valid number. For example as described with respect to FIG. 3, calling number verificator 304 may verify that the calling party number has not been spoofed by placing an outbound call to the calling party number and analyzing the operating status of the call. In an embodiment, calling number verificator 304 verifies a validity of the call request based on whether the call request originates from a location or a device associated with the calling party number. In an embodiment, the verification result is a credibility score indicating how likely the calling party number is valid. In an embodiment as depicted with respect to FIG. 2 and described with respect to FIG. 3, calling number verificator 304 requests an external verification device to perform the verifying.

In steps 408-412, calling number authenticator 306 compares a plurality of information related to the calling party number with corresponding thresholds or requirements within authentication parameters 314 to determine whether the calling party number can be used to authorize the call request. For example, the plurality of information may be information retrieved by calling number authenticator 306 in step 404.

In step 408, calling number authenticator 306 checks whether one or more queried attributes 336 satisfy the thresholds or rules stored within authentication parameters 314. For example, calling number authenticator 306 may determine whether a line type of the calling number is one of the acceptable line types specified in authentication parameters 314. Further, calling number authenticator 306 may compare a queried call velocity with a maximum threshold (which may depend on an identified line type) retrieved from authentication parameters 314. In an embodiment, calling number authenticator 306 tracks a number of queried attributes 336 that satisfy the corresponding thresholds or rules within authentication parameters 314.

In step 410, calling number authenticator 306 determines whether the retrieved number of linked accounts 338 is between one and a threshold value, inclusive, in authentication parameters 314. In an embodiment, if the number of linked accounts 338 exceeds the corresponding threshold value from authentication parameters 314, calling number authenticator 306 determines that the call request cannot be authenticated. In an embodiment, the threshold value noted above may vary depending on values of other identified parameters, such as whether the calling party number is of a specific line type, a purpose of the call request, or whether the calling party number has been authenticated or authorized within a time period, etc.

In step 412, calling number authenticator 306 checks fraud history 324 of each account 322 linked to the calling party number. Like steps 408-410, calling number authenticator 306 may compare logged fraud history 324 with authentication parameters 314. For example, calling number authenticator 306 may authenticate the call request based on whether any fraud attempt has been logged with any linked account 322 within the last month, or another specified number of days.

In step 414, calling number authenticator 306 generates an authentication result based on the results of steps 406-412. Therefore, calling number authenticator 306 may factor the verification result of step 406 in determining the authentication result. The authentication result includes information indicating whether the call request and associated calling party or caller is authenticated. In an embodiment, calling number authenticator 306 authenticates the call request if calling number verificator 304 verified the validity of the call request and a certain number of checked parameters (in steps 408-412) meets the corresponding thresholds and rules of authentication parameters 314. For example, the call request is verified when the calling party number, e.g., ANI number, is valid as explained in step 406. In an embodiment, if any check or verification performed by steps 406-412 fails, calling number authenticator 306 generates an authentication result indicating that the call request is not authenticated. For example, if the number of accounts linked to the calling party number exceeds a threshold value, then calling number authenticator 306 generates an authentication result indicating that the call request is not authenticated. In an embodiment, one of the checked parameters that needs to be met is whether the number of accounts linked to the calling party number is between one and a threshold value, inclusive.

In an embodiment, calling number authenticator 306 calculates a confidence score based on the results of steps 406-112. Each of the results may be weighted differently. For example, a verification result may have a larger impact on the confidence score than, for example, a check on the frequency of calls associated with the calling party number. In an embodiment, a result to be used in calculating the confidence score includes whether the calling party number had been previously authenticated within the past month, or other threshold number of days.

To generate an authentication result, calling number authenticator 306 may compare the calculated confidence score with a risk threshold retrieved from authentication parameters 314. The risk threshold may be retrieved based on one or more queried values of parameters. For example, calling number authenticator 306 may retrieve a different risk threshold based on a line type identified for the calling party number. Calling number authenticator 306 may authenticate the call, for example, when the confidence score exceeds the retrieved risk threshold.

In step 416, calling number authenticator 306 updates accounts database 320 and calling party information database 330 to enable authentication parameter tuner 308 to (periodically or on-demand) adjust one or more authentication parameters 314. For example, calling number authenticator 306 may save the authentication result in authentication history 334 of calling party information database 330.

In step 418, calling number authenticator 306 sends the authentication result to the call processing receiver, such as call processing receiver 114 of FIG. 1. The call processing receiver uses the authentication result to accurately and efficiently process the call request. For example, when the authentication result indicates that the call request is authenticated, the call processing receiver may immediate authorize the received and routed call request without requesting, e.g., via an automated voice message, additional information from the caller. Therefore, the call processing receiver provides a streamlined interface without unnecessary voice or button-press processing, depending on how the additional information is input from the caller. In contrast, when the authentication result indicates that the call request is not authenticated, not only is the call request not authorized, the call processing receiver may request additional information to authenticate the caller of the call. In an embodiment, when the call request was routed by the call processing receiver to an IVR device or a called party device, calling number authenticator 306 forwards the authentication result to the routed device.

Figure 5:
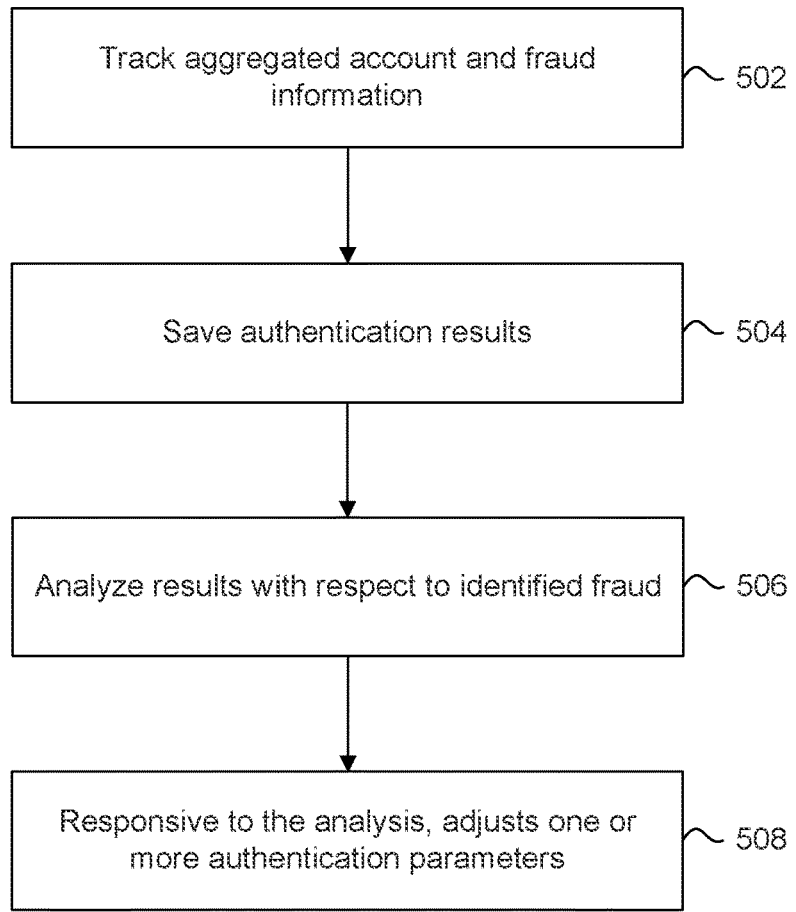
FIG. 5 is a flow chart of a method for improving accuracy of generating authentication results, according to an embodiment.

FIG. 5 is a flow chart of a method 500 for improving accuracy of generating authentication results, according to an embodiment. In an embodiment, steps of method 500 may be performed by authentication device 302 of FIG. 3. For ease of reference, steps of method 500 will be described with respect to the components of authentication device 302. In an embodiment, authentication parameter tuner 308 performs the steps of method 500 periodically, when an accuracy of calling number authenticator 306 falls below a threshold, or when a fraud rate increases above a threshold.

Method 500 starts in step 502. In step 502, authentication parameter tuner 308 tracks account and fraud information aggregated across a plurality of databases, for example, databases of called entities 210A-C in FIG. 2.

In step 504, authentication parameter tuner 308 saves or logs authentication results generated by calling number authenticator 306 for each call request and associated calling party number. In an embodiment, calling number authenticator 306 also saves or logs the authentication results in authentication history 334 for calling party number 332.

In step 506, authentication parameter tuner 308 analyzes the authentication results of step 504 with respect to fraud identified for one or more previously authenticated call requests. In an embodiment, the analysis includes computing and tracking an accuracy rate of calling number authenticator 306 using a set of configured authentication parameters 314.

In step 508, responsive to the analysis of step 506, authentication parameter tuner 308 adjusts one or more authentication parameters 314 to increase the accuracy rate of calling number authenticator 306 or to decrease the rate of fraud. In an embodiment, authentication parameter tuner 308 makes adjustments based on a history of logged accuracy rates and fraud rates for each set of configured authentication parameters 314 as well as previous adjustments made to authentication parameters 314. For example, calling number authenticator 306 may decrease a threshold for the number of linked accounts (an example of authentication parameters 314) when the previous adjustment to decrease the threshold decreased the overall fraud rate or increased the accuracy rate of calling number authenticator 306.

Various embodiments, such as embodiments described with respect to devices or systems of FIGS. 1-3, can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) or data.

Computer system 700 may also include one or more secondary storage devices or memory 710. Secondary memory 710 may include, for example, a hard disk drive 712 or a removable storage device or drive 714. Removable storage drive 714 may be a floppy disk drive, a magnetic tape drive, a compact disk drive, an optical storage device, tape backup device, or any other storage device/drive.

Removable storage drive 714 may interact with a removable storage unit 718. Removable storage unit 718 includes a computer usable or readable storage device having stored thereon computer software (control logic) or data. Removable storage unit 718 may be a floppy disk, magnetic tape, compact disk, DVD, optical storage disk, and/any other computer data storage device. Removable storage drive 714 reads from or writes to removable storage unit 718 in a well-known manner.

According to an exemplary embodiment, secondary memory 710 may include other means, instrumentalities or other approaches for allowing computer programs or other instructions or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired or wireless, and which may include any combination of LANs, WANs, the Internet, etc. Control logic or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems or computer architectures other than that shown in FIG. 7. In particular, embodiments may operate with software, hardware, or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodi-

What is claimed is:

1. A method, comprising:
receiving a call request and associated calling party information that includes a calling party number, wherein the call request is initiated by a caller;
verifying that the calling party number is a valid calling party number based at least in part on one or more calling party number attributes or an operating status of the calling party number;
in response to the verifying, authenticating the call request, the authenticating comprising:
retrieving fraud information for one or more accounts linked to the calling party number;
determining a risk score for the calling party number based at least in part on the calling party information, wherein the risk score is determined based at least in part on the fraud information for the one or more accounts;
generating an authentication result for the call request based at least in part on the determined risk score, wherein the authentication device generates the authentication result before the call request is answered by an agent associated with a called party device;
providing the authentication result to a call processing device that processes the call request from the caller based at least in part on the authentication result; and
adjusting one or more authentication parameter thresholds based at least in part on the authentication result to reduce incorrectly authenticated call requests.

2. The method of claim 1, wherein the verifying comprises requesting a verification system to perform the verifying, wherein the verification system is external to a device that authenticates the call request.

3. The method of claim 1, wherein the verifying comprises determining that the calling party number originates from a known physical location assigned to or associated with the calling party number.

4. The method of claim 1, wherein the verifying comprises placing an outbound call to the calling party number and analyzing the operating status of the calling party number during the outbound call.

5. The method of claim 1, wherein the verifying comprises determining a credibility score indicating a likelihood that the calling party number is valid.

6. The method of claim 1, wherein the authenticating further comprises comparing the determined risk score to a maximum risk score selected for the call request.

7. The method of claim 1, further comprising:
associating the authentication result with the calling party number; and
wherein the adjusting comprises adjusting the one or more authentication parameter thresholds based at least in part on an accuracy of the authentication result.

8. The method of claim 1, wherein the providing comprises providing the authentication result to the call processing device as a visual or audio indication.

9. The method of claim 1, wherein the call processing device processes the call request without further authentication.

10. A system, comprising:
a memory;
a processor coupled to the memory;
a communications interface that when executing in the processor receives a call request and associated calling party information that includes a calling party number, wherein the call request is initiated by a caller;
a calling number verificator that when executing in the processor, verifies that the calling party number is a valid calling party number based at least in part on one or more calling party number attributes or an operating status of the calling party number;
a calling number authenticator that when executing in the processor:
responsive to the verifying, authenticates the call request by:
retrieving fraud information for one or more accounts linked to the calling party number;
determining a risk score for the calling party number based at least in part on the calling party information, wherein the risk score is determined based at least in part on the fraud information for the one or more accounts;
generating an authentication result for the call request based at least in part on the determined risk score, wherein the authentication device generates the authentication result before the call request is answered by an agent associated with a called party device;
provides the authentication result to a call processing device that processes the call request from the caller based at least in part on the authentication result; and
adjusting one or more authentication parameter thresholds based at least in part on the authentication result to reduce incorrectly authenticated call requests.

11. The system of claim 10, wherein the calling number verificator further determines that the calling party number originates from a known physical location assigned to or associated with the calling party number.

12. The system of claim 10, wherein the calling number verificator further determines a credibility score indicating how likely that the calling party number is valid.

13. The system of claim 10, wherein the calling number authenticator further compares the determined risk score to a maximum risk score selected for the call request.

14. The system of claim 10, wherein the calling number authenticator provides the authentication result to the call processing device as a visual or audio indication.

15. The system of claim 10, wherein the call processing device processes the call request without further authentication.

16. A non-transitory computer-readable device having instructions stored thereon that, when executed by at least one computing device, causes the at least one computing device to perform operations comprising:
receiving a call request and associated calling party information that includes a calling party number, wherein the call request is initiated by a caller;
verifying that the calling party number is a valid calling party number based at least in part on one or more calling party number attributes or an operating status of the calling party number;
in response to the verifying, authenticating the call request, the authenticating comprising:
retrieving fraud information for one or more accounts linked to the calling party number;
determining a risk score for the calling party number based at least in part on the calling party information, wherein the risk score is determined based at least in part on the fraud information for the one or more accounts;

generating an authentication result for the call request based at least in part on the determined risk score, wherein the authentication device generates the authentication result before the call request is answered by an agent associated with a called party device;

providing the authentication result to a call processing device that processes the call request from the caller based at least in part on the authentication result; and adjusting one or more authentication parameter thresholds based at least in part on the authentication result to reduce incorrectly authenticated call requests.

17. The non-transitory computer-readable device of claim 16, wherein the verifying comprises determining that the calling party number originates from a known physical location assigned to or associated with the calling party number.

18. The non-transitory computer-readable device of claim 16, wherein the verifying comprises determining a credibility score indicating a likelihood that the calling party number is valid.

19. The non-transitory computer-readable device of claim 16, wherein the authenticating further comprises comparing the determined risk score to a maximum risk score selected for the call request.

20. The non-transitory computer-readable device of claim 16, wherein the call processing device processes the call request without further authentication.

* * * * *

UNITED STATES PATENT AND TRADEMARK OFFICE
CERTIFICATE OF CORRECTION

PATENT NO. : 12,244,760 B1
APPLICATION NO. : 18/057490
DATED : March 4, 2025
INVENTOR(S) : Cox et al.

It is certified that error appears in the above-identified patent and that said Letters Patent is hereby corrected as shown below:

In the Drawings

On Sheet 4 of 6, FIG. 4, Tag 416, Line 2, delete "authenication" and insert -- authentication --, therefor.

On Sheet 4 of 6, FIG. 4, Tag 418, Line 1, delete "authenication" and insert -- authentication --, therefor.

In the Specification

In Column 1, Line 8, delete "17/652,034," and insert -- 17/652,034 (issued as U.S. Pat. No. 11,509,763), --, therefor.

In Column 2, Line 14, delete "(VOIP)" and insert -- (VoIP) --, therefor.

In Column 5, Line 12, delete "(VOIP)" and insert -- (VoIP) --, therefor.

In Column 5, Line 42, delete "(VOIP)" and insert -- (VoIP) --, therefor.

In Column 6, Line 35, delete "(PII) information" and insert -- information (PII) --, therefor.

In Column 7, Line 3, delete "dialed number information (DNIS)" and insert -- dialed number identification service (DNIS) --, therefor.

In Column 7, Line 21, delete "and any" and insert -- and/or any --, therefor.

In Column 9, Lines 9-10, delete "dialed number information (DNIS)" and insert -- dialed number identification service (DNIS) --, therefor.

In Column 9, Line 45, delete "8,238,523B1," and insert -- 8,238,523 B1, --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,244,760 B1

In Column 10, Line 10, delete "types," and insert -- types. --, therefor.

In Column 13, Line 25, delete "dialed number (DNIS)" and insert -- dialed number identification service (DNIS) --, therefor.

In Column 17, Line 6, delete "computer system 700" and insert -- computer system 600 --, therefor.

In Column 17, Line 7, delete "FIG. 7. Computer system 700" and insert -- FIG. 6. Computer system 600 --, therefor.

In Column 17, Line 10, delete "Computer system 700" and insert -- Computer system 600 --, therefor.

In Column 17, Line 12, delete "processor 704. Processor 704" and insert -- processor 604. Processor 604 --, therefor.

In Column 17, Line 13, delete "bus 706" and insert -- bus 606 --, therefor.

In Column 17, Line 14, delete "processors 704" and insert -- processors 604 --, therefor.

In Column 17, Line 22, delete "Computer system 700" and insert -- Computer system 600 --, therefor.

In Column 17, Line 23, delete "device(s) 703" and insert -- device(s) 603 --, therefor.

In Column 17, Line 25, delete "structure 706 through user input/output interface(s) 702" and insert -- structure 606 through user input/output interface(s) 602 --, therefor.

In Column 17, Line 26, delete "Computer system 700" and insert -- Computer system 600 --, therefor.

In Column 17, Line 27, delete "memory 708" and insert -- memory 608 --, therefor.

In Column 17, Line 28, delete "memory 708" and insert -- memory 608 --, therefor.

In Column 17, Line 29, delete "memory 708" and insert -- memory 608 --, therefor.

In Column 17, Line 31, delete "Computer system 700" and insert -- Computer system 600 --, therefor.

In Column 17, Line 32, delete "memory 710" and insert -- memory 610 --, therefor.

In Column 17, Line 33, delete "memory 710 may include, for example, a hard disk drive 712" and insert -- memory 610 may include, for example, a hard disk drive 612 --, therefor.

In Column 17, Line 34, delete "drive 714" and insert -- drive 614 --, therefor.

In Column 17, Line 35, delete "storage drive 714" and insert -- storage drive 614 --, therefor.

CERTIFICATE OF CORRECTION (continued)  Page 3 of 4
U.S. Pat. No. 12,244,760 B1

In Column 17, Line 38, delete "Removable storage drive 714" and insert -- Removable storage drive 614 --, therefor.

In Column 17, Line 39, delete "storage unit 718. Removable storage unit 718" and insert -- storage unit 618. Removable storage unit 618 --, therefor.

In Column 17, Line 42, delete "storage unit 718" and insert -- storage unit 618 --, therefor.

In Column 17, Line 43, delete "and/any" and insert -- and/or any --, therefor.

In Column 17, Line 44, delete "storage drive 714" and insert -- storage drive 614 --, therefor.

In Column 17, Line 45, delete "storage unit 718" and insert -- storage unit 618 --, therefor.

In Column 17, Line 48, delete "memory 710" and insert -- memory 610 --, therefor.

In Column 17, Line 50, delete "computer system 700" and insert -- computer system 600 --, therefor.

In Column 17, Line 52, delete "storage unit 722" and insert -- storage unit 622 --, therefor.

In Column 17, Line 53, delete "interface 720. Examples of the removable storage unit 722" and insert -- interface 620. Examples of the removable storage unit 622 --, therefor.

In Column 17, Line 54, delete "interface 720" and insert -- interface 620 --, therefor.

In Column 17, Line 60, delete "Computer system 700" and insert -- Computer system 600 --, therefor.

In Column 17, Line 61, delete "network interface 724. Communication interface 724" and insert -- network interface 624. Communication interface 624 --, therefor.

In Column 17, Line 62, delete "computer system 700" and insert -- computer system 600 --, therefor.

In Column 17, Line 65, delete "reference number 728" and insert -- reference number 628 --, therefor.

In Column 17, Line 66, delete "interface 724 may allow computer system 700" and insert -- interface 624 may allow computer system 600 --, therefor.

In Column 17, Line 67, delete "remote devices 728" and insert -- remote devices 628 --, therefor.

In Column 18, Line 1, delete "path 726" and insert -- path 626 --, therefor.

In Column 18, Line 4, delete "computer system 700 via communication path 726" and insert -- computer system 600 via communication path 626 --, therefor.

In Column 18, Line 10, delete "computer system 700, main memory 708" and insert -- computer system 600, main memory 608 --, therefor.

In Column 18, Line 11, delete "memory 710, and removable storage units 718" and insert -- memory 610, and removable storage units 618 --, therefor.

In Column 18, Line 12, delete "722, as well as tangible articles" and insert -- 622, as well as tangible articles --, therefor.

In Column 18, Line 15, delete "computer system 700" and insert -- computer system 600 --, therefor.

Figure 6:
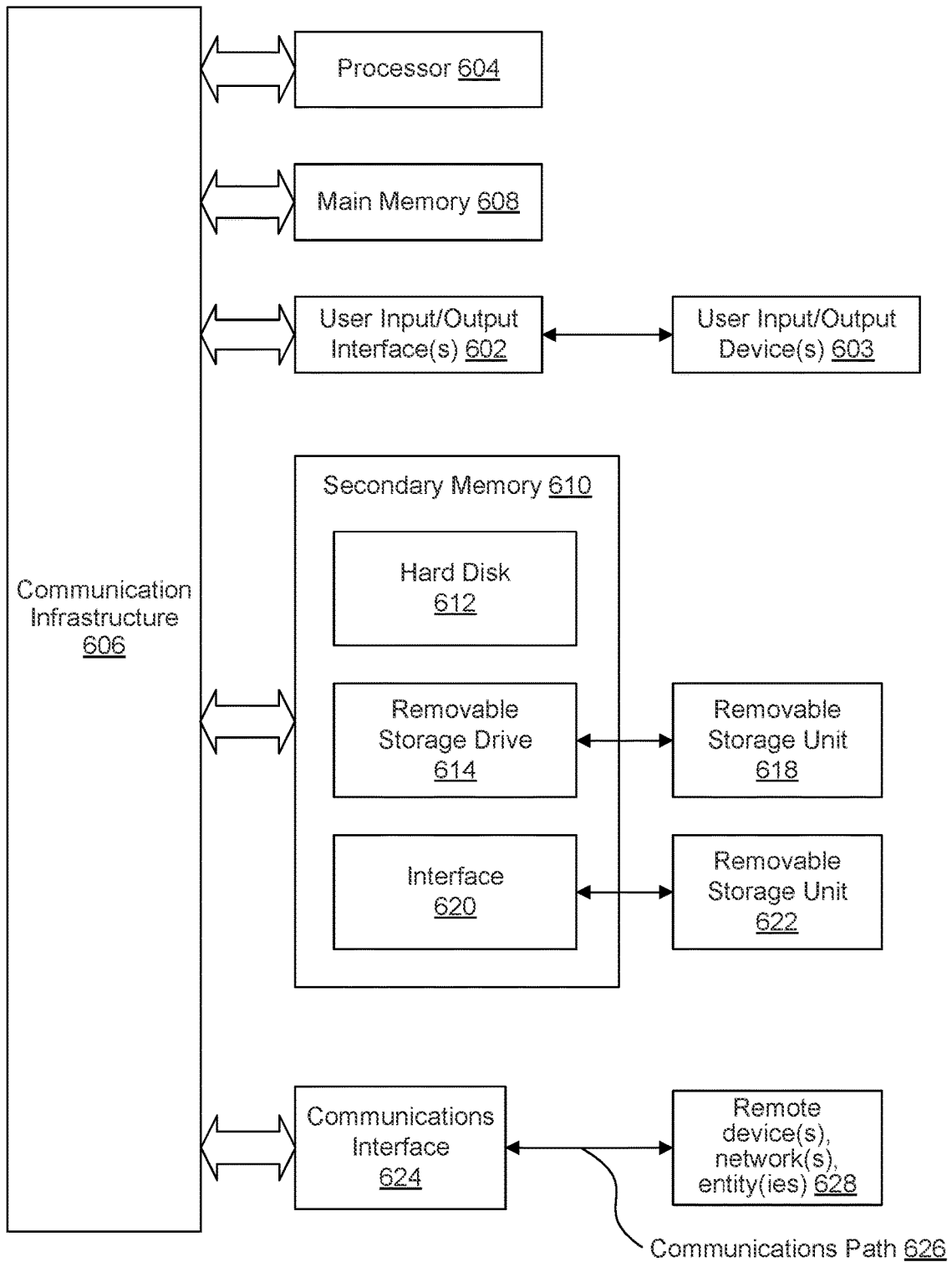
FIG. 6 is a diagram of a computer system on which the methods and systems herein described can be implemented, according to an embodiment.

In Column 18, Line 21, delete "shown in FIG. 7" and insert -- shown in FIG. 6 --, therefor.